United States Patent

Doxey

[15] 3,703,674
[45] Nov. 21, 1972

[54] LINE FOLLOWING
[72] Inventor: Brian Cecil Doxey, Welwyn, England
[73] Assignee: The British Oxygen Company Limited, London, England
[22] Filed: Nov. 9, 1970
[21] Appl. No.: 88,151

[30] Foreign Application Priority Data

Nov. 14, 1969 Great Britain..........56,000/69

[52] U.S. Cl. ...................318/577, 250/202, 250/237
[51] Int. Cl. ............................................G05b 19/36
[58] Field of Search....219/125 P; 318/577; 250/202, 250/237

[56] References Cited

UNITED STATES PATENTS 3,401,589 9/1968 Druschel et al........250/202 X
3,423,589 1/1969 Bardwell et al............318/577

*Primary Examiner*—Benjamin Dobeck
*Attorney*—Dennison, Dennison, Townshend & Meserole

[57] ABSTRACT

In a method of following a line or silhouette pattern photoelectrically, in order to control associated cutting or other equipment corners or crossovers which are unable to be traced accurately in one pass are traced in two or more passes with the aid of masks positioned in succession over the pattern. Each mask has on it additional paths or blanking portions or both to convert each corner or crossover on the pattern into an unambiguous path of curvature small enough to be followed accurately. The associated equipment is inhibited as the additional paths are followed.

4 Claims, 3 Drawing Figures

INVENTOR
BRIAN CECIL DOXEY

LINE FOLLOWING

This invention relates to following a line, particularly one which traces out the desired path of a tool relative to a workpiece.

By 'line' in this specification is meant either a line as such or the boundary of a silhouette or like pattern used to define the desired path. The term 'tool' in this specification is similarly intended to include welding or cutting torches using electric arcs or plasmas, or gas-fuelled flames, and any device, such as a laser, for directing at a workpiece a beam of photons, electrons, or other energy-carriers intended to do work on the workpiece.

Such lines are normally followed by a photoelectrically-controlled device, called a line follower, which moves relatively to a pattern of the path to be followed.

For inertial and other reasons line followers are able to trace round bends of only more than a minimum radius of curvature, i.e. they cannot accurately follow corners or other lines which change direction abruptly. Another disadvantage is that they cannot normally follow a 'crossover', by which is meant the intersection of two lines of which one is the line being followed. This is because when the follower arrives at the junction of a crossover it cannot decide which of the alternative lines radiating from the junction is the one which it has to follow.

The present invention aims at overcoming these disadvantages, and accordingly provides a method of enabling photoelectrically-controlled line followers to trace out unambiguously a path containing one or more crossovers or sharp corners or both, which method is as claimed in the respective appended claims.

When the line follower is used to control the movement of associated cutting or welding equipment relative to a workpiece, then it is desirable to control also the operation of the equipment by means of the line follower.

According to a further feature of this invention there is provided a line follower which is as claimed in the respective appended claims.

The present invention will now be described by way of example with reference to the accompanying drawing, in which.

Figure 1:
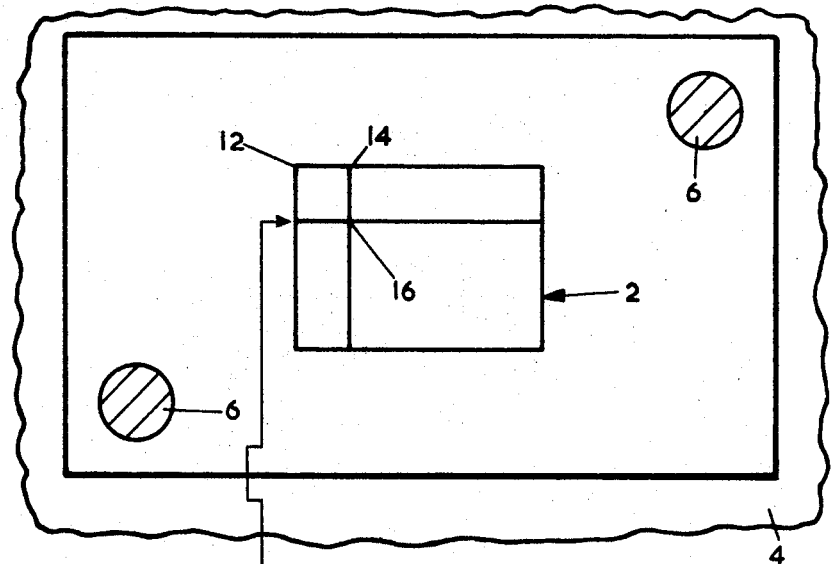
FIG. 1 is a plan view of a drawing showing a simple path to be followed by a line follower but having in it crossovers and sharp bends.

The path 2 to be followed is drawn on, or otherwise applied to, a sheet 4 of support material. The boundaries of sheet 4 are greater than the boundaries of the path 2, and in the resultant marginal portions are positioned two pegs 6. The pegs are of right cylindrical form and project upwardly from the surface of sheet 4.

The pegs are to enable masks 10 to be positioned on the sheet 4 and accurately located. Thus in the masks shown in FIGS. 2 and 3, corresponding pairs of holes 8 are provided so that when the masks 10 are positioned over the sheet 4 with the pegs 6 projecting through the holes 8 there is no possibility of relative movement between the mask 10 and the sheet 4.

The path 2 is drawn in thin, sharp lines of uniform width which are usually in the form of black lines on a white background to give the maximum visual contrast to the photosensitive components of the line follower.

As will be seen from FIG. 1, the path 2 presents several sharp bends, as at 12, and two different types of crossover, as shown at 14 and 16. These features of the path 2 would make it impossible for a normal line follower to follow the path and cause the associated cutting or welding equipment (not shown) to follow it with any acceptable degree of accuracy.

Accordingly the present invention aims at removing any potential ambiguity in the drawing presented to the line follower by successively applying two or more masks to the drawing to be followed. A typical mask is shown in FIG. 2.

Figure 2:
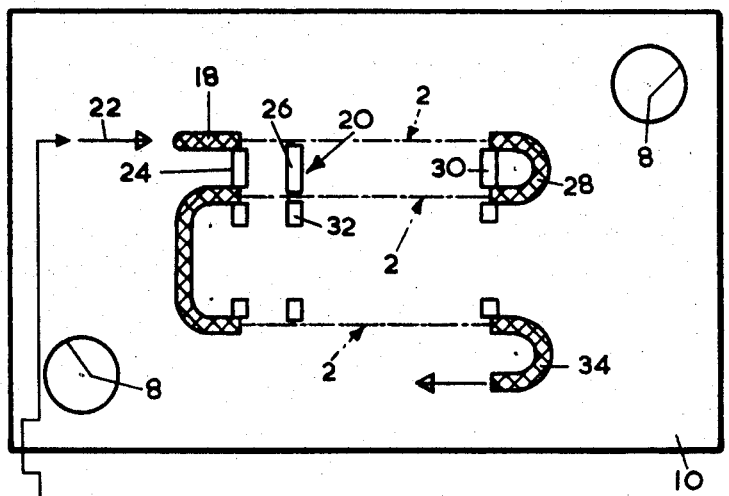
FIG. 2 is a plan view of a mask to be used in conjunction with the drawing of FIG. 1 to define the horizontal portions of the path shown in FIG. 1.

The mask 10 shown in FIG. 2 is of transparent material having applied to it, in selected portions thereof, two different types of areas. The areas shown in the drawing by cross-hatched lines represent black elongated areas of uniform width which are substantially thicker than the lines of path 2, the thickness of these black areas 18 being related to the optical characteristics of the line follower (not shown).

The areas represented by the plain rectangles 20 are opaque, and are usually of a white or other color to which the line follower is not sensitive. The function of areas 20 is to mask portions of the path 2 which would mislead the line follower.

Both the black areas 18 and the masking areas 20 could be of ink, paint, or other opaque material, but preferably they are made of a plastics film which is able to adhere to the mask 10 without the use of adhesives.

The thickness of the areas 18 is chosen so that the follower is able to follow them, but because of their thickness the follower is not able to keep accurately aligned with the central axis of the areas 18. The principal advantage of this is that the signals given out by the line follower when the photosensitive portions thereof are aligned with the black areas 18 are of considerably lower amplitude than the signals generated when the follower is following the lines of the path 2.

Except as mentioned below, the construction and mode of operation of a line follower of the present invention is conventional. Line followers which can be used are described in our UK Pat. specifications Nos. 1,014,975 and 1,204,315. Because the basic line followers do not form part of the subject-matter of this invention, they are neither described herein in greater detail nor shown in the accompanying drawing.

Included in the circuitry of the line follower, but not shown, is a comparator to which are fed the signals generated by the photosensitive components. The comparator has a reference signal fed to it, the arrangement being that when the signal produced by the component is less than the reference signal, such as when the follower is aligned with a black area 18, then the comparator produces a signal inhibiting the operation of the associated tools as defined herein. However when the signal produced by the components is greater than the reference signal, such as when the follower is aligned directly with part of the path 2, then this inhibition signal is removed so that the tool is operated to do the desired work on the workpiece. As the tool is not being operated during the times that the follower is tracing the black areas 18, the low accuracy of tracing the lines 18 is immaterial.

The masking areas 20 are intended to be applied to corners and crossovers so that they hide from the photosensitive components of the line follower those portions of the corner or crossover which are not to be followed. The areas 20 may be used either by themselves or in conjunction with the black areas 18, as can be seen from the masks shown in FIGS. 2 and 3.

It might be helpful to describe how the invention works, by considering the mask 10 shown in FIG. 2 in position on the sheet 4. Manually or otherwise the line follower is aligned with that portion of the black area 18 adjacent the 'Start' arrow 22. When the follower is energized it follows the area 18 until it comes to the end thereof. During this portion of movement the comparator associated with the line follower generates the above-mentioned inhibition signal, so that the associated cutting or welding equipment is not operated but is only moved over the surface of the workpiece. The function of the particular masking area 24 is to hide from the line follower the vertical (as viewed in the drawing) part of the upper left-hand corner 12 of the path 2. Thus when the line follower has come to the right-hand end of the black area 18 it can follow only the horizontal portion of path 2. As soon as it becomes aligned with the path 2 then the resultant increase in the signals produced by the line follower removes the inhibition signal so that the associated cutting or welding equipment is operated. As the line follower continues to trace out the the path 2 it comes to the junction 14. However the particular masking area 26 is similarly effective to hide the vertical line of this junction, so that the follower continues to see only a continuous thin line.

When it reaches the end of the upper horizontal line of path 2 it encounters a U-shaped black area 28. The radius of curvature of area 28 is equal to or greater than the minimum radius which the line follower can follow while still maintaining its required degree of accuracy. The masking area 30 functions to hide from the line follower the vertical line forming part of the upper right-hand corner of path 2. As soon as the line follower starts following the area 28 the inhibition signal is produced by the comparator, this continuing until the line follower next starts to trace out the intermediate horizontal line of path 2. When this happens the line follower functions as described above until it reaches the crossover 16. Here, however, a second masking area 32 has been applied having its end spaced from area 26 by a distance sufficient to leave the horizontal portion of the path 2 but to hide from the line follower both the vertical portions thereof, so that the presence of the crossover has no effect on the operation of the follower.

Figure 3:
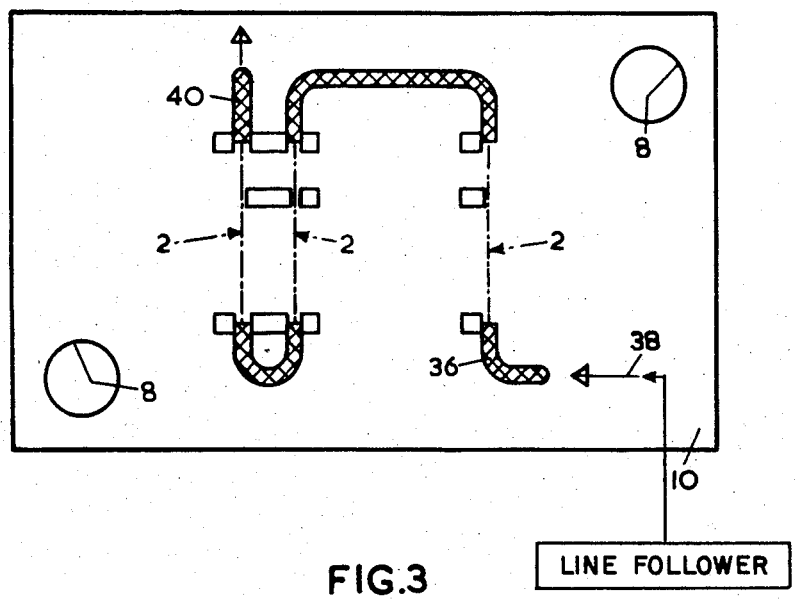
FIG. 3 is a view of a second mask adapted to be used in conjunction with the drawing of FIG. 1 to define the vertical portions of the path.

The line follower operates over the remaining horizontal portion of the path 2 until it reaches the U-shaped black area 34. Here the line follower is stopped either manually or automatically. Then the mask shown in FIG. 2 is removed and is replaced by one as shown in FIG. 3. Thereafter the line follower is aligned with the curved portion of line material 36 adjacent to the 'Start' arrow 38 and the follower is reenergized to now start following the vertical lines of paths 2 in a similar sinuous path until finally it reaches the end black area 40, after which the line follower is stopped.

It will then be seen, by consideration of the paths presented to the line follower by the successive superpositioning of the masks shown in FIGS. 2 and 3, that the path 2 has been completely traced-out by the follower, with the addition of interconnecting paths during the following of which an inhibition signal has been generated, so that as far as the associated cutting or welding equipment is concerned it has been operated to produce in the workpiece only the path 2, irrespective of the additional paths traced out by the follower.

Although the pegs 6 have been described as being of circular cross-section, this is not necessary, as pegs of non-circular cross-section could be used. The pegs 6 may be positioned accurately by placing both or all the masks on top of the sheet 4 and then cutting through all the superposed layers by means of a suitable punch, so that holes of identical shape are produced in all the layers. Thereafter a flanged stud or other object can be secured to the sheet 4 to produce the peg 6, the stud being of identical shape with the punch so that the desired exact fit of the masks and sheet is obtained.

I claim:

1. A method of enabling photoelectrically-controlled line followers to trace out unambiguously a path containing one or more crossovers or sharp corners or both, including using as the path to be followed a drawing or other representation of the complete path desired; superposing on the drawing in succession two or more masks of which each blanks out potentially-confusing portions of the drawing so that the follower is presented with an unambiguous path which is a fraction of the complete path, and tracing each of the fractional paths in succession whereby the follower follows the complete path.

2. A line-following method as claimed in claim 1, in which at least one of the masks is provided with at least one auxiliary path portion linking two parts of the complete path and nowhere having a radius of curvature less than that which the follower can follow accurately.

3. A line-following method as claimed in claim 2, in which each of the said auxiliary path portions is of significantly-greater width than that of the complete path.

4. A line-following method as claimed in claim 3, in which when following the said auxiliary path portion the line follower generates a signal inhibiting operation of an associated tool.

* * * * *